United States Patent [19]

Schilkey et al.

[11] Patent Number: 4,867,924
[45] Date of Patent: Sep. 19, 1989

[54] METHOD AND APPARATUS FOR COMPRESSION MOLDING UNDER VACUUM

[75] Inventors: Daniel P. Schilkey; James R. Hamner, both of Sterling Heights, Mich.

[73] Assignee: The Budd Company, Troy, Mich.

[21] Appl. No.: 185,121

[22] Filed: Apr. 22, 1988

[51] Int. Cl.$^4$ ............................................. B29C 43/04
[52] U.S. Cl. .................... 264/101; 264/319; 425/405.1; 425/DIG. 60
[58] Field of Search ............... 264/101, 102, 299, 319; 425/405.1, 405.2, 388, 420, DIG. 60, DIG. 47

[56] References Cited

U.S. PATENT DOCUMENTS

| | | | |
|---|---|---|---|
| 2,876,492 | 3/1959 | Frieder et al. | 425/405.1 |
| 3,103,698 | 9/1963 | Wollett | 425/148 |
| 3,347,962 | 10/1967 | Dieck et al. | 264/102 |
| 3,784,343 | 1/1974 | Iwasaki | 425/405.1 |
| 3,840,239 | 10/1974 | Fazekas et al. | 277/235 R |
| 3,997,286 | 12/1976 | Gabrys | 425/405.1 |
| 4,204,822 | 5/1980 | Hewitt | 425/210 |
| 4,417,864 | 11/1983 | Shigeo et al. | 425/405.1 |
| 4,488,862 | 12/1984 | Epel et al. | 425/405.1 |
| 4,551,085 | 11/1985 | Epel et al. | 425/405.1 |
| 4,612,149 | 9/1986 | Iseler et al. | 264/101 |
| 4,759,280 | 7/1988 | Malashenko | 425/450.1 |

Primary Examiner—Jan H. Silbaugh
Assistant Examiner—Jill L. Heitbrink
Attorney, Agent, or Firm—Harness, Dickey & Pierce

[57] ABSTRACT

Kicker cylinders are used in a vacuum compression molding method and apparatus to initially break the seal between two members of the mold in order to facilitate quick opening of the mold to thereby increase part cycle time.

11 Claims, 2 Drawing Sheets

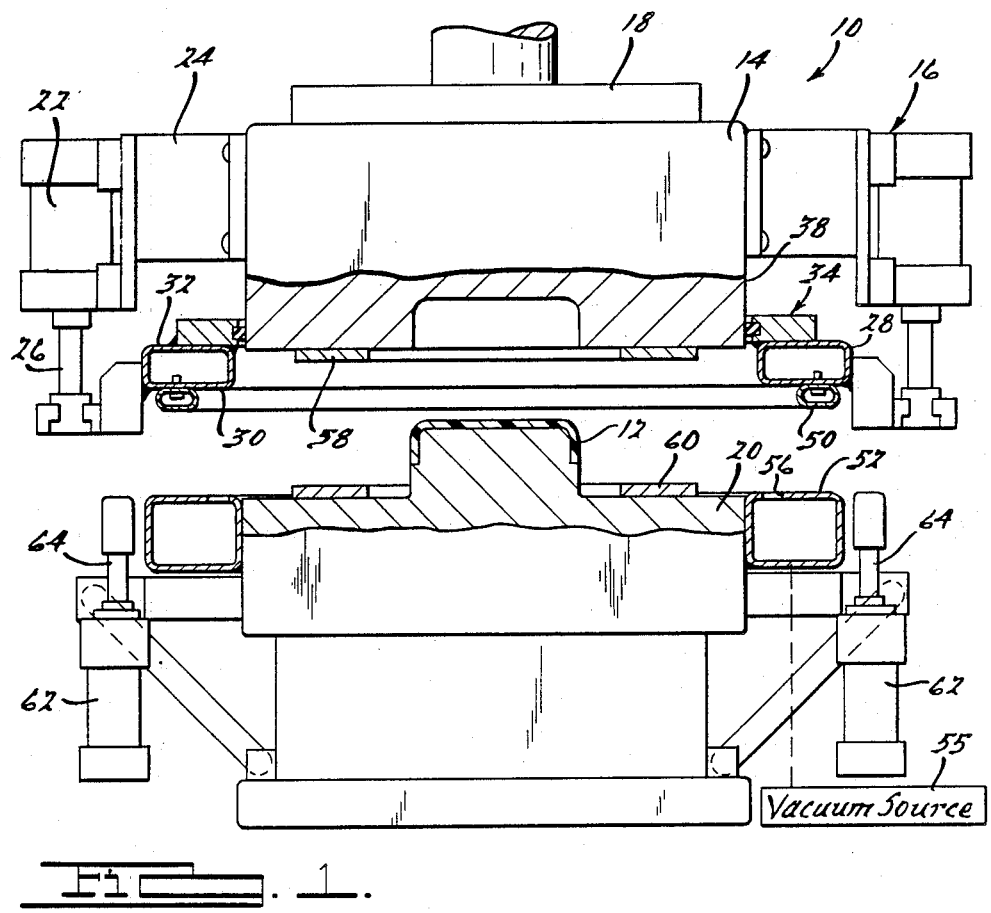
FIG. 1.
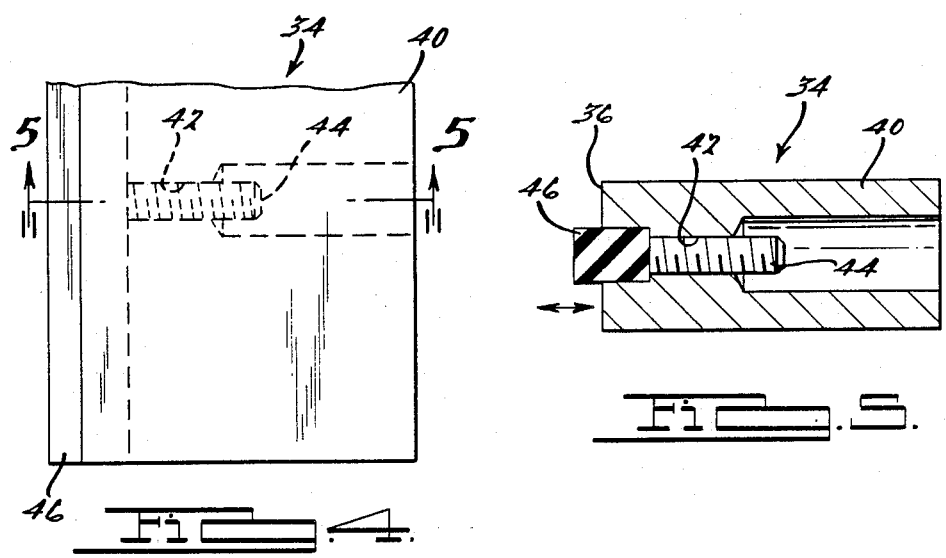
FIG. 4.
FIG. 5.

METHOD AND APPARATUS FOR COMPRESSION MOLDING UNDER VACUUM

BACKGROUND

1. Technical Field

This invention relates to molding apparatus and, more particularly, apparatus for compression molding a part under vacuum.

2. Discussion

Commonly-assigned U.S. Pat. Nos. 4,488,862 to Epel et al.; 4,551,085 to Epel et al.; 4,612,149 Iseler et al. disclose methods and apparatus wherein parts are compression molded under vacuum. These patents are hereby incorporated by reference. The present invention is an improvement to the subject matter disclosed in these prior patents.

SUMMARY OF THE INVENTION

According to the broad teachings of this invention, provision is made for assisting the separation of the mold members which have been temporarily sealed together to define a vacuum chamber around the mold cavity. In the preferred embodiment, a sealing ring surrounds the upper die and it makes a seal with a fixed lower member surrounding the lower die. The ring also contains a seal which makes wiping engagement with the upper die. When the upper die is lowered into place the seal between the lower die and upper die is made before the upper die contacts the charge. Thus, a vacuum chamber is defined around the mold cavity. A vacuum is then drawn and the upper die proceeds downwardly to cooperate with the lower die to define and cure the part. The vacuum created during the molding operation tends to make it difficult to break the seal when it is later desired to open the molding apparatus and remove the part. To facilitate this process, one or more kicker cylinders are provided which thrust upwardly against the sealing ring to thereby break the seal between the upper and lower die. In such manner, quicker part cycle times can be achieved.

BRIEF DESCRIPTION OF THE DRAWINGS

These and various other advantages of the present invention will become apparent to those skilled in the art upon studying the following specification and by reference to the drawings in which:

FIGS. 1-3 are side views of molding apparatus made in accordance with the teachings of this invention, with portions thereof shown in cross section, during various stages of the molding operation;

FIG. 4 is a plan view looking down on a portion of the wiping seal shown in FIG. 3; and FIG. 5 is a cross-sectional view taken along the lines 4—4 of FIG. 4.

BRIEF DESCRIPTION OF THE PREFERRED EMBODIMENT

Figure 2:
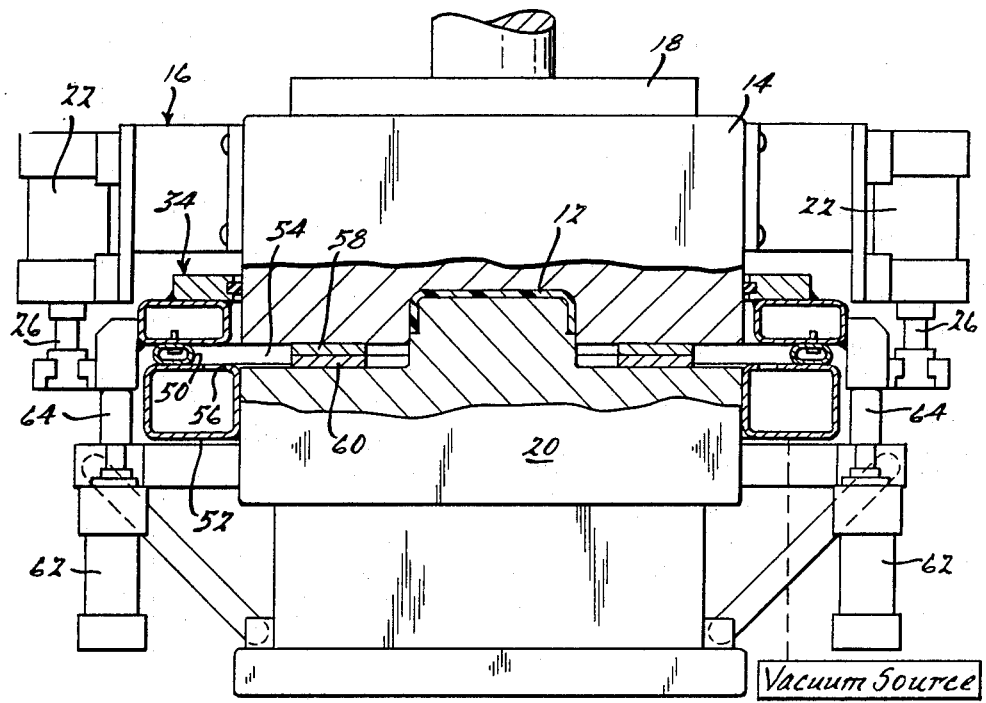

FIG. 1 essentially shows the molding apparatus 10 as it would appear during the beginning and ending of the part cycle. The only major difference is that part 12 shown in FIG. 1 would not yet have been formed during the beginning part of the cycle but instead it would be replaced with a suitable charge of fiber reinforced plastic from which the part is formed. As discussed in the above-referenced patents, the present invention finds particular utility in forming automotive body panels having large surfaces (exceeding about 1 square foot) which must have extremely smooth finishes. The piston rods 64 of the kicker cylinder 62 would also be retracted instead of extended as shown in FIG. 1 at the beginning of the part cycle. More will be said about the kicker cylinders later herein.

In the beginning of the molding cycle the upper die 14 and sealing ring 16 are moved downwardly under the operation of a suitable ram 18 towards the lower die 20. The sealing ring 16 includes several air cylinders 22 connected at their upper ends via brackets 24 to upper die 14 and, hence, to ram 18. The cylinders 22 include depending piston rods 26 which are substantially fully extended during the beginning of the part cycle under the constantly applied air pressure to the cylinders. The lower end of the piston rods 26 are coupled to an annular tubular member 28 which presents a lower surface 30 and upper surface 32.

Attached to the upper surface 32 is a sealing device 34 shown most clearly in FIGS. 4 and 5. Sealing device 34 includes a housing 40 having an inner edge 36 spaced from the outer side wall 38 of the upper die 14. The housing 40 has a horizontally extending threaded bore 42 therein for receiving adjustment screw 44. The inner end of adjustment screw 44 is mounted to a Teflon wiper seal 46 designed to make a wiping sealing engagement with the smooth vertical wall 38 of the upper die 14. As the seal 46 wears, the operator can overcome this wear by suitably rotating adjustment screw 44 to maintain the proper engagement between the seal 46 and walls of upper die 14.

The lower surface 30 of member 28 carries an annular tubular seal 50 which is aligned with an annular member 52 fixed to the lower die 20. As the ram 18 brings the upper die 14 and sealing ring 16 downwardly, the seal 50 first becomes in contact with the upper surface of member 52. A vacuum chamber is thus formed that surrounds the mold cavity which shall later be more precisely defined when the upper and lower dies fully nest. The vacuum chamber which is generally designated by the numeral 54 in FIG. 2 is defined by the seal 50 between the upper and lower die, and the seal 46 between the ring 16 and upper die 14. This vacuum chamber 54 is formed before the upper die 14 touches the charge (not shown) lying on the lower die 20. At this time a vacuum is quickly drawn from the vacuum chamber through a suitable vacuum source 55 which communicates with vacuum chamber 54 through the hollow tubular member 52 and openings 56 therein.

The ram 18 continues its downward movement to bring the dies into the position shown in FIG. 2 wherein the stops 58, 60 come into contact. It should be noted that the piston rods 26 retract into their respective cylinders 22 as a result of the further downward movement of the upper die 14, the large force of ram 18 overcoming the much smaller force provided by the air pressure in cylinders 22.

Figure 3:
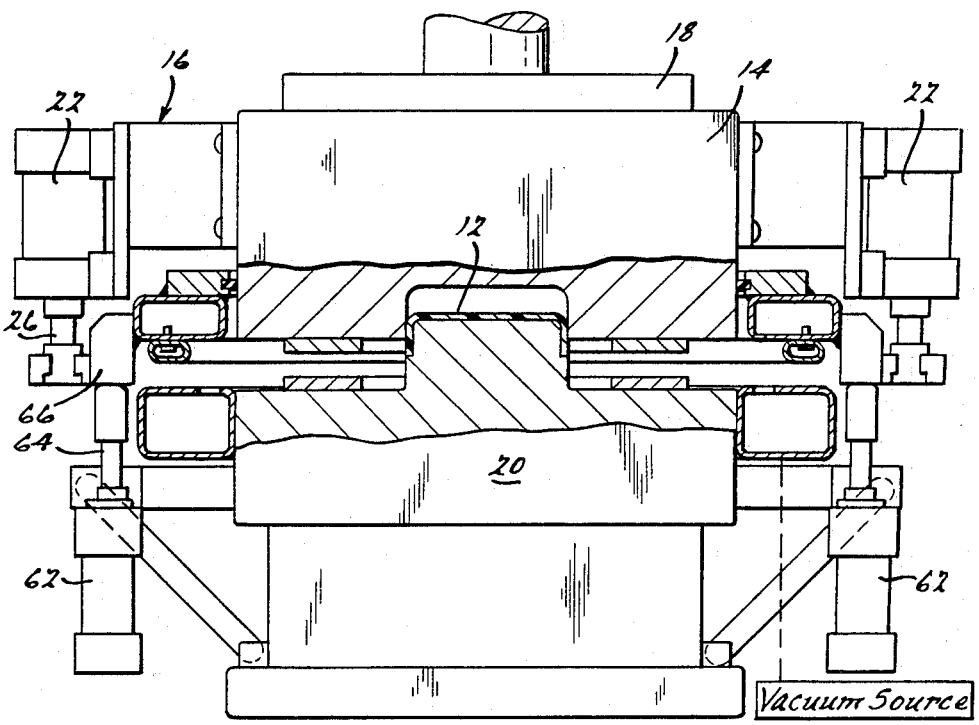

After the part has been sufficiently formed (e.g., by sufficient heat, time and pressure to cure the charge), the mold must be opened to enable the part to be removed. It is a feature of this invention that the mold can be opened very quickly and with a minimal amount of maintenance problems that might otherwise occur. By doing so, the part cycle time can be kept to a minimum thereby increasing the throughput for a given machine. To this end, a plurality of kicker cylinders 62 are provided to enhance quick opening of the mold members. Cylinders 62 are preferably spaced substantially equally around the mold 10 underneath the sealing ring 16. Each cylinder 62 has its piston rod 64 vertically aligned with an apron portion 66 of the sealing ring 16. With special reference to FIG. 3, cylinders 62 are designed to provide an upward thrust or "kick" which is sufficient to overcome the downward pressure provided by cylinders 22 and the additional adhesion of seal 50 created by the vacuum. In this specific embodiment, the cylinders 62 are hydraulic and are activated at the beginning of the mold opening step before ram 18 begins lifting. In such manner the seal between the upper and lower dies is first broken. Otherwise, the ram 18 must overcome the vacuum seal between the dies that has been created. By first using the kicker cylinders 62 to break the seal, the ram 18 can be raised very quickly thereby increasing the part cycle.

After the part 12 has been removed, the kicker piston rods 64 are retracted and a new part cycle can be begun.

It should be understood that while this invention has been described in connection with a particular example thereof, that no limitation is intended thereby except as defined in the following claims.

What is claimed is:

1. A method of compression molding a part, said method comprising:
   placing a charge on a lower die of a compression molding apparatus;
   using a ram to move an upper die and sealing ring into a position wherein a vacuum seal is made by the sealing ring surrounding a mold cavity defined by the upper and lower dies;
   creating a vacuum in the mold cavity;
   forming the part; and moving the sealing ring to break the vacuum seal surrounding the
   mold cavity independently of the ram so that the dies can be quickly opened after the vacuum seal is broken.

2. The method of claim 1 wherein a plurality of kicker cylinders are activated to break the seal before the ram is used to lift the upper die during opening of the mold.

3. The method of claim 2 wherein the part is an automotive body panel having a surface area exceeding about 1 square foot.

4. In a vacuum molding apparatus having a pair of members moveable relative to each other under the action of a ram, the apparatus including a sealing ring surrounding one of the members that is in sealing engagement with said one member, the sealing ring cooperating with the other member to create a seal around the two members during molding of a part in which the members are closed, the improvement which further comprises:
   first means located around the other member and aligned with the sealing ring, said first means having a selectively activatable device for moving upwardly against the sealing ring, said device being separate from the sealing ring and ram;
   second means for activating the device of the first means after the part is molded to cause the device to push the sealing ring away from the other member to thereby break the seal while the members remain essentially closed; and
   third means for moving the ram to separate the members after activation of the second means.

5. The apparatus of claim 4 wherein said first means comprises:
   at least one kicker cylinder having a reciprocating piston rod aligned with a portion of the sealing ring, said kicker cylinder being activated by the second means to cause the piston rod to lift the sealing ring away from the other member to thereby break the seal therebetween.

6. The apparatus of claim 5 wherein said sealing ring includes a plurality of air cylinders normally causing piston rods thereof to be fully extended, and wherein said at least one kicker cylinder comprises a plurality of kicker cylinders providing sufficient force to partially retract the piston rods of the sealing ring cylinders during breaking of the seal.

7. The apparatus of claim 4 wherein said sealing ring has a wiping seal device mounted thereon providing a wiping seal against one said member said seal device including a housing for carrying a resilient seal, and adjustment means for adjusting the position of the seal relative to the housing thereby adjusting for wear of the seal to ensure a good sealing engagement with the mold member.

8. The apparatus of claim 7 wherein the seal wipes against an outer side surface of the one member, with the seal housing including a threaded bore therein for receiving an adjustment screw accessible for adjustment by a human operator.

9. Apparatus for compression molding a charge into a part, said apparatus comprising:
   a moveable upper die:
   a sealing ring surrounding the upper die, said sealing ring having a plurality of first cylinders having normally downwardly extending piston rods the ends of which carry a first sealing device making wiping sealing engagement with an outer side surface of the upper die, the ends of the piston rods further carrying a second seal;
   a lower die cooperating with the upper die to form a mold cavity in the shape of the desired part;
   ram means for moving the upper die and sealing ring downwardly until the second seal abuts a fixed member surrounding the lower die thereby defining a vacuum chamber encompassing the mold cavity;
   vacuum means for evacuating the vacuum chamber;
   said ram means being further adapted to continue downward movement of the upper die until the mold cavity is defined and the dies are closed; and
   kicker cylinder means surrounding the lower die and being vertically in line with a portion of the sealing ring, said kicker cylinder means having piston rods that raise upwardly to overcome the force of the sealing ring cylinders to thereby break the seal provided by the second seal after the part has been formed and before the ram is lifted to open the dies thereby facilitating quick opening of the mold.

10. The apparatus of claim 9 wherein said kicker cylinders are hydraulic cylinders and the cylinders of the sealing ring are air cylinders.

11. The apparatus of claim 9 which further comprises: adjustment means for horizontally adjusting the position of the first seal to accommodate for wear.

* * * * *